United States Patent [19]

Schatzmann

[11] Patent Number: 5,434,406
[45] Date of Patent: Jul. 18, 1995

[54] HEMISPHERIC MATRIXSIZED IMAGING OPTICAL SYSTEM

[75] Inventor: Rudolf E. Schatzmann, Santa Ana, Calif.

[73] Assignee: McDonnell Douglas Corporation, Long Beach, Calif.

[21] Appl. No.: 61,396

[22] Filed: May 13, 1993

[51] Int. Cl.⁶ .................................................. G01S 3/78
[52] U.S. Cl. .............................. 250/203.2; 250/203.3; 250/203.6; 250/227.32; 356/139.01; 359/42
[58] Field of Search ............... 250/203.1, 203.2, 203.3, 250/203.4, 203.6, 206.1, 206.2, 227.2, 227.32, 342, 353; 356/139.01, 141.2, 141.5; 359/39, 41, 42, 36

[56] References Cited

U.S. PATENT DOCUMENTS

| | | | |
|---|---|---|---|
| 3,496,367 | 2/1970 | Eckermann | 250/203 |
| 3,600,581 | 8/1971 | Menke | 250/83 R |
| 3,869,615 | 3/1975 | Hoover | 250/508 |
| 4,058,726 | 11/1977 | Paschedag et al. | 250/353 |
| 4,087,688 | 5/1978 | Keller | 250/342 |
| 4,314,761 | 2/1982 | Reymond et al. | 356/141 |
| 4,322,124 | 3/1982 | Padgitt et al. | 350/1.4 |
| 4,442,359 | 4/1984 | Lederer | 250/342 |
| 4,479,056 | 10/1984 | Zierhut | 250/342 |
| 4,915,500 | 4/1990 | Selkowitz | 356/221 |
| 4,950,881 | 8/1990 | Kaltschmidt | 250/203.6 |
| 5,012,081 | 4/1991 | Jungwirth et al. | 250/203.6 |

Primary Examiner—David C. Nelms
Assistant Examiner—John R. Lee
Attorney, Agent, or Firm—John P. Scholl; George J. Netter

[57] ABSTRACT

An optical seeker (10) has an objective lens group (12) with a wide field of view (e.g., up to about 180 degrees). Light energy from objects within a field of regard is focused by the objective lens group (12) onto the end of a congruous overlay rod (24) and on exiting the rod it is acted upon by a two-dimensional matrix shutter (46) to selectively pass only one small zone (50) while suppressing passage of the remainder of the light energy. A light sensing array 22 is of such size as to merely accommodate one zone (50) at a time.

9 Claims, 2 Drawing Sheets

HEMISPHERIC MATRIXSIZED IMAGING OPTICAL SYSTEM

BACKGROUND

1. Field of the Invention

The present invention relates generally to a system for acquiring, examining and tracking a source, target or other object that radiates or reflects electromagnetic energy, and, more particularly, to such a system providing a an extended field of view without a corresponding increase in the number of sensor elements or detector elements and associated processing electronics.

2. Description of Related Art

In trackers or seekers, for example, both IR and normal visual spectral range, it has been conventional in the past in order to cover a relatively large viewing region to require that the optical system be mounted on a gimbal system so that it may sweep an extended field of regard. Typically, such a system has a relatively narrow effective field of view for its objective lens system (e.g., about 1°) which must scan a substantially greater region of interest through the aid of the gimbal action. Moreover, other system sensing apparatus consists of a plurality of individual optical systems such that as an aggregate they view the total field of regard, of which each optical system has its own focal plane array and interconnection with processing equipment.

Exemplary of the size of the focal plane array driven by the number of light energy sensor elements needed, an optical system for a 1° field of view requires a focal plane array in excess of 84,600 individual sensor elements with associated leads for each sensor element. If in an attempt to eliminate the gimbal, objective lenses with a field of view of, say, 60° were used, a corresponding focal plane array of over $304.5 \times 10^6$ sensor elements with individual leads would be required as well as substantial processing equipment enlargement. The addition to overall expense and complexity is apparent.

Also, the matter of weight and size of focal plane array with cryogenic cooling and signal and data processing equipment needed to produce an effective tracking system is especially critical in a missile or other airborne situation where both weight and space are at a premium.

SUMMARY OF THE INVENTION

It is therefore a primary aim and object of the present invention to provide a relatively wide angle optical tracker or seeker that does not require either physical scanning apparatus to cover the full field of regard, or a prohibitively large number of light sensors or detectors.

A further object is to provide a system as in the previous system in which the field of regard in a static mode is optically subdivided into field-of-view zones forming a matrixsized image plane. Each of the zones or matrix-cells can be selectively projected onto a common detector array sized for the effective field-of-view, thus limiting the size of the focal plane detector array to the current state of the art and technology.

At the forward end of the described system there is an objective lens for gathering light emitted or reflected by objects entering the field of regard having a relatively wide field of view which can approximate a hemispheric solid angle. Just behind the objective lens is a focusing lens which takes all of the light rays received by the objective lens and focuses it onto one end of an image congruous overlay rod, which essentially is a waveguide for passing light rays focused on the one end to the other end without geometric distortion. One device for accomplishing this includes a square cross-section glass or plastic rod which passes image light rays from the one end to the other by repeated internal reflections superimposing the image planes formed for each of the field-of-view zones. Another device useful for this purpose consists of a hollow tube of square cross-section having highly reflective interior wall surfaces.

A first group of lenses recollimates each of the bundles of light beams corresponding to a given field-of-view zone coming from the overlay rod into an expanded collimated beam. A still further set of lenses receives the recollimated light beams and focuses them in a superimposed condition at a predetermined desired focal plane assembly at which a light sensing array is located.

Between the groups of recollimating and reimaging lenses there is located a two-dimensional matrix shutter for selectively controlling the transmission of that portion which corresponds to the desired field-of-view zone, hence blocking out the image forming light bundles from the remaining zones, and focuses the selected light bundle onto the light sensing array. More particularly, the matrix shutter provides selective transmission of any desired portion of the light rays within the objective lens field of view.

In the practice of the present invention an enlarged field of regard approximating a hemispheric solid angle can be fully optically monitored with a sensing array that has no more light sensor detector elements than a gimballed system with objective lenses of only about 1° field of view.

DESCRIPTION OF A PREFERRED EMBODIMENT

Figure 1:
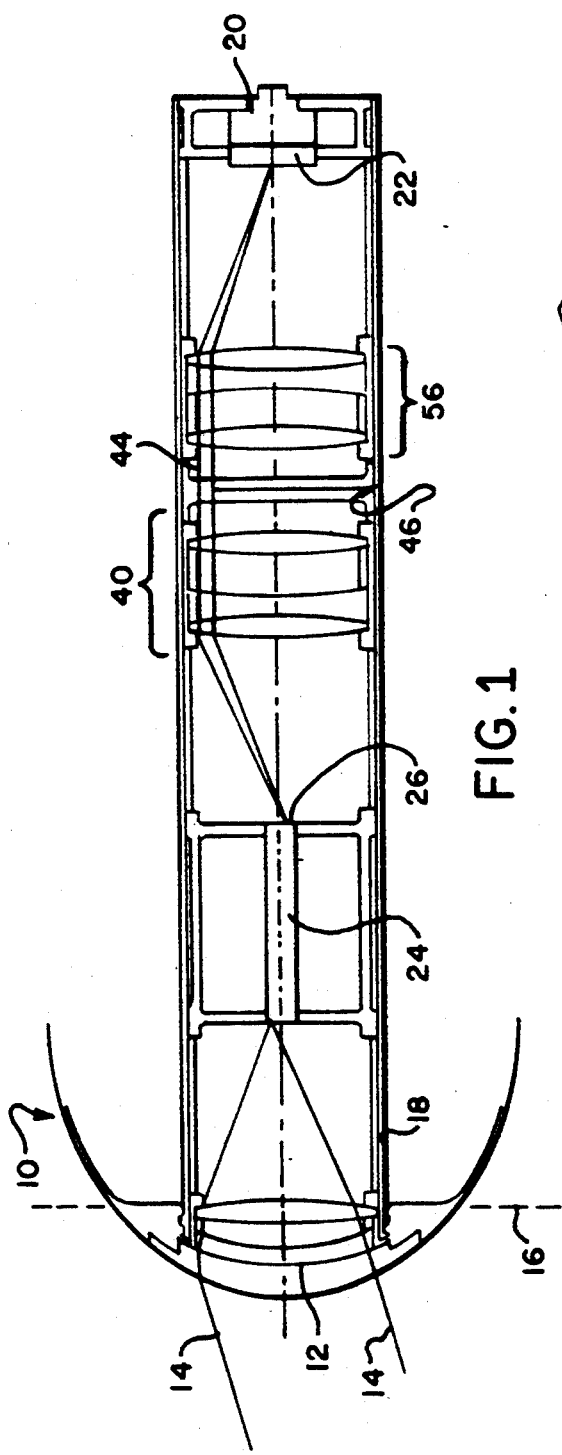
FIG. 1 is a side elevational view of the optical system of the seeker in accordance with the present invention.

Turning now to the drawing and particularly FIG. 1, there is shown a seeker enumerated generally as 10 which at its forward end includes an objective lens 12 via which target light rays 14 are received from a monitored region of regard of relatively wide field of view which can be as much as approximately a solid angle corresponding to an outwardly extending hemisphere 16. Just behind the objective lens within the seeker is a cylindrical shell or housing 18, the forward open end of which is fitted to receive light coming through the objective lens and includes the parts to be described for directing light signals received at the forward end and focusing them at a focal plane assembly 20 onto a light sensing array 22.

Light coming from the objective lens focuses onto an end of an image congruous overlay rod 24 which passes the various light images received along the rod where the same images are emitted at the rod opposite end face 26.

Figure 2:
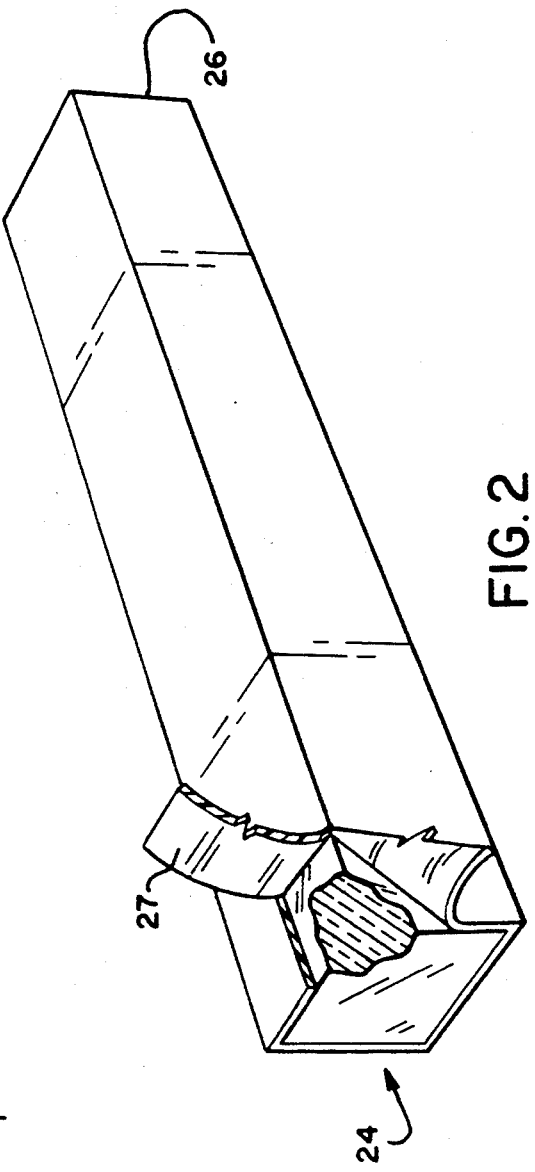
FIG. 2 is a perspective partially sectional view of one form of image congruous overlay rod.

Turning to FIG. 2, it is seen that the congruous overlay rod is a solid rod of transparent glass (or plastic) having a uniform square cross-section. The outer surface is provided with a reflective layer 27 (e.g., silver) which causes an incident beam to be repeatedly reflected until it exits at 26. Some glass materials have a refractive index such that light will reflect from the interface with air and not require silvering.

Figure 3:
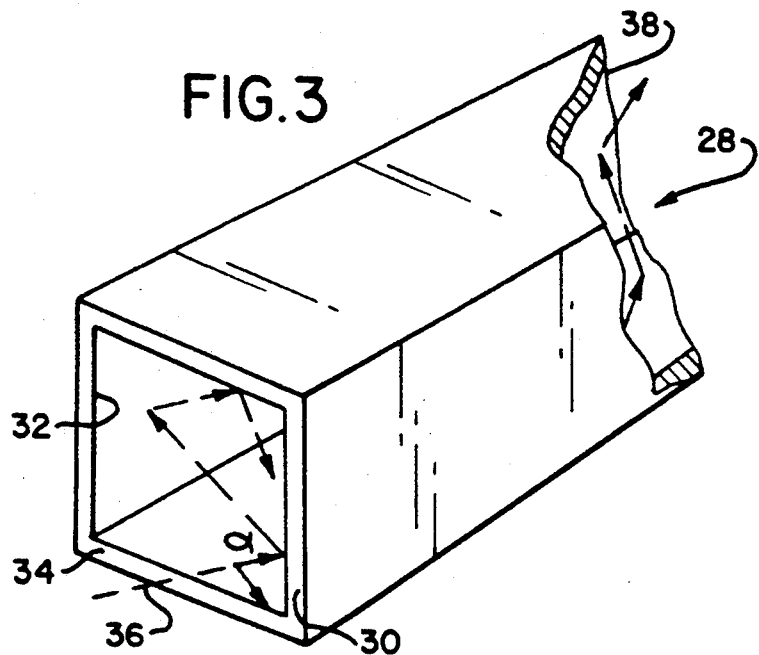
FIG. 3 is a perspective partially sectional view of an alternative form of congruous overlay rod.

In FIG. 3, an alternative form of overlay rod 28 is shown generally including an elongated, open-ended, hollow tube 30 of square cross-section. The internal wall surfaces 32 are specially prepared or coated to be highly reflective of the radiation that enters the forward facing tube end 34. Irrespective of the angle of incidence α of incoming radiation rays 36, they are transmitted along the interior of the tube to develop a discrete image at the posterior end 38 that superimposes with the other beams from the other field-of-view zones.

The radiation rays on leaving the tube posterior end 38 are received by a collimating lens group 40 which forms the rays coming from what may be a number of target radiation sources into a corresponding number of parallel beams, columns or shafts of radiation 44.

Collimated light 44 from the lens group 40 is directed onto a two-dimensional matrix shutter 46 which is a device for selectively passing a cross-sectional portion of the entire collimated beam (e.g., radiation from a selected target region) while blocking the remainder of the radiation. In this manner selected targets and immediate regions can be examined at any one time by the seeker rather than as in conventional systems which process the entire field of regard radiation all at the same time.

Figure 4:
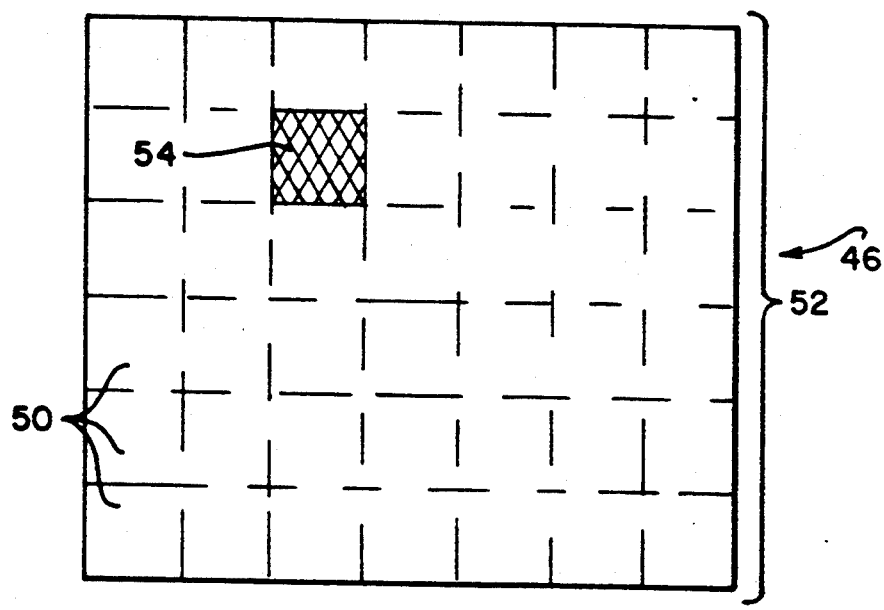
FIG. 4 is an elevational view of a matrix shutter showing selective passage of light energy therethrough.

FIG. 4 shows the shutter 46 in front elevational view. The total collimated light beam 44 covers the full shutter area. It is to be noted that the entire shutter surface is divided into a plurality of identical smaller rectangular areas 50, each of which is of preselected size to enable the light from a single such area being accommodated by the light sensing array 22. As an example, the shutter may include a liquid crystal arrangement 52 which is electrically energizable to enable any one of the areas 50, such as cross-hatched area 54, to pass radiation therethrough while simultaneously causing the remainder of the shutter area to be opaque.

A reimaging lens group 56 receives the selected small area (54) target radiation from the shutter 46 and focuses it onto the focal plane assembly 20 which includes the light sensing array 22. The sensed radiation is then converted to electric signal form by the sensor elements and processed in a known way to calculate precise brightness and direction to the target, for example.

In accordance with the practice of this invention an optical sensor and seeker system is provided having a very large viewing angle (e.g., up to approximately 180 degrees) which is achieved without having to increase the size of a sensing array or number of sensing elements from that presently required for a 1° viewing angle. Also, this large viewing angle or field of regard is achieved without having to employ such scanning techniques as gimbal mounting of the telescope system or mirror system which are relatively costly, heavy and complex. It has been suggested that very large focal plane detector arrays such as a mosaic array could be used. However, this latter approach would also be costly and bear inherently high technical risk.

The invention has been described primarily in connection with an optical seeker. However, it is considered that the described system could also be advantageous in a reconnaissance camera, wide field camera or telephoto camera, and in surveillance apparatus. Also, although described relative to a system operating on visible or infrared light rays, it is to be understood that the invention may be advantageously employed where the electromagnetic energy reflected from objects in the field of regard has a wavelength shorter than visible light such as in the microwave region, for example. In the latter case, glass lenses would not be used but appropriately designed waveguides, instead.

Although the invention has been described in connection with a preferred embodiment, it is to be understood that those skilled in the art may effect modifications that come within the spirit of the disclosure and ambit of the appended claims.

What is claimed is:

1. A system for monitoring light energy received from one or more objects located within a field of regard, comprising:
   an objective lens group having a field of view in the range of approximately 30 to 180 degrees for receiving light energy from the objects in the field of regard;
   a waveguide located to receive light energy from the objective lens group including hollow open-ended tube of square cross-section, the inner wall surfaces of said tube being efficiently reflective of incident light energy;
   a collimating lens group coupled to receive light from the wave guide;
   shutter means located to intercept collimated light from the collimating lens group for selectively transmitting only a portion of the collimated light said shutter means including a liquid crystal device having a total transparent area sufficient to encompass the collimated light and controllable to block the passage of said collimated light therethrough except for any one of a selected plurality of portions of said collimated light while obstructing the remainder;
   a further lens group for converting the collimated light from the shutter means to an image; and
   an array of light sensing elements for receiving the image from the further lens group.

2. A system as in claim 1, in which the waveguide includes a solid glass rod of uniformly square cross-section having a reflective coating on the outer side surfaces.

3. A system as in claim 1, in which the waveguide is a solid rod of uniformly square cross-section constructed of a transparent material having a refractive index such that light passing along said waveguide will be reflected from the material-air boundary.

4. A system as in claim 3, in which the material is glass.

5. A system as in claim 3, in which the material is a synthetic plastic.

6. A system as in claim 1, in which the light energy is in the visible range.

7. A system as in claim 1, in which the light energy is in the infrared range.

8. A system for static monitoring a field of regard exceeding 1 degree, comprising:
   means having a sufficient field of view for receiving light energy emanating from any object located within the field of regard including an objective lens group, a waveguide receiving light energy from the objective lens and a collimating lens group;

shutter means for receiving the full light energy from the receiving means and allowing light energy from any selected areal portion thereof to pass through while blocking the remainder of the light energy; and an array of light sensing elements of a dimensioned extent merely sufficient to encompass the selected areal portions of light energy passing through the shutter.

9. A static optical system for irradiating a sensor array with light energy emanating from objects located within a field of regard, comprising:

means for statically forming an image of the total light energy coming from the field of regard including an objective lens group having a field of view sufficient to statically encompass the entire field of regard and a waveguide for receiving and transmitting an image from the objective lens group of the entire field of regard;

means for selectively passing a portion of the image at a time to the sensor array while obstructing passage of the remainder of the image including shutter means having a plurality of substantially identically dimensioned zones, said shutter means being selectively actuatable to permit passage of light impinging upon any selected zone therethrough while preventing passage of light energy impinging upon all other zones.

* * * * *